(12) United States Patent
Schreiner et al.

(10) Patent No.: US 10,845,377 B1
(45) Date of Patent: Nov. 24, 2020

(54) ADJUSTABLE MOMENT COUNTERWEIGHT WITH MULTIPLE LOCKING METHODS

(71) Applicant: Rosemount Aerospace Inc., Burnsville, MN (US)

(72) Inventors: Alexander Schreiner, Eagan, MN (US); Kaleb Anderson, Goodhue, MN (US); Richard Alan Schwartz, Faribault, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/443,156

(22) Filed: Jun. 17, 2019

(51) Int. Cl.
*G01P 13/00* (2006.01)
*G01P 13/02* (2006.01)
*B64D 43/02* (2006.01)

(52) U.S. Cl.
CPC ............ *G01P 13/025* (2013.01); *B64D 43/02* (2013.01)

(58) Field of Classification Search
CPC .............................. G01P 13/025; B64D 43/02
USPC ....................................................... 73/178 R
See application file for complete search history.

(56) References Cited

U.S. PATENT DOCUMENTS

| 2,918,817 | A | | 12/1959 | Hughes, Jr. et al. | |
|---|---|---|---|---|---|
| 3,221,549 | A | * | 12/1965 | Wetmore | B64D 43/02 73/178 R |
| 3,665,760 | A | | 5/1972 | Pitches et al. | |
| 3,882,721 | A | * | 5/1975 | Neary | G01P 13/025 73/170.02 |
| 5,438,865 | A | * | 8/1995 | Greene | G01P 13/025 73/170.05 |
| 9,574,901 | B2 | * | 2/2017 | Dupont de Dinechin | G01C 23/00 |
| 10,015,481 | B2 | * | 7/2018 | Jarok | G02B 27/644 |
| 10,124,424 | B2 | * | 11/2018 | Frota de Souza Filho | B23C 5/16 |
| 10,145,265 | B2 | * | 12/2018 | Skilton | F01D 21/003 |
| 10,295,396 | B2 | * | 5/2019 | Dupont De Dinechin | G01G 19/07 |
| 2002/0189340 | A1 | | 12/2002 | Roberge et al. | |
| 2016/0356175 | A1 | * | 12/2016 | Waddington | G01P 5/165 |

FOREIGN PATENT DOCUMENTS

| EP | 802007 A | 8/1936 |
|---|---|---|
| EP | 0326477 A1 | 8/1989 |

OTHER PUBLICATIONS

Extended European Search Report for EP Application No. 19213773.5, dated Jul. 22, 2020, 13 pages.

* cited by examiner

*Primary Examiner* — Jamel E Williams
(74) *Attorney, Agent, or Firm* — Kinney & Lange, P.A.

(57) ABSTRACT

An adjustable moment counterweight assembly for an angle of attack sensor includes a fixed counterweight configured to fixedly attach to a shaft of the angle of attach sensor, the shaft being rotatable about an axis; an adjustable counterweight configured to move in a radial direction relative to the fixed counterweight via rotation of a threaded member; and a first fastener in operable communication with the fixed counterweight and the adjustable counterweight such that the first fastener can fixedly attach the adjustable counterweight to the fixed counterweight.

20 Claims, 3 Drawing Sheets

ADJUSTABLE MOMENT COUNTERWEIGHT WITH MULTIPLE LOCKING METHODS

BACKGROUND

The present disclosure relates generally to sensors, and more particularly, to angle of attack sensors.

Angle of attack sensors with rotatable vanes are installed on sides or a leading edge of a wing of an aircraft to measure the aircraft angle of attack, which is the angle between oncoming airflow and the aircraft zero line (a reference line of the aircraft, such as a chord of a wing of the aircraft). The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. Rotational position of the vane is sensed and used to determine the aircraft angle of attack.

Angle of attack sensors with rotatable vanes include a counterweight mounted on the same shaft as the vane to balance the vane and prevent the vane from rotating due to gravitational force, which could result in an erroneous sensor measurement.

SUMMARY

An adjustable moment counterweight assembly for an angle of attack sensor includes a fixed counterweight configured to fixedly attach to a shaft of the angle of attach sensor, the shaft being rotatable about an axis; an adjustable counterweight configured to move in a radial direction relative to the fixed counterweight via rotation of a threaded member; and a first fastener in operable communication with the fixed counterweight and the adjustable counterweight such that the first fastener can fixedly attach the adjustable counterweight to the fixed counterweight.

A method of adjusting a counterweight assembly for an angle of attack sensor includes fastening an adjustable counterweight to a body portion of a fixed counterweight with a threaded member, rotating the threaded member to move the adjustable counterweight toward and/or away from the body portion of the fixed counterweight to obtain a prescribed first moment for the counterweight assembly, locking the adjustable counterweight in a position providing the first moment, and mounting the counterweight assembly to a rotatable shaft to which a vane is secured. The threaded member is fastened to the body portion with a locking nut disposed in the body portion of the fixed counterweight.

An angle of attack sensor includes a rotatable shaft disposed on an axis, a vane fixedly attached to the rotatable shaft and configured to rotate the shaft when a force acts upon the vane, and an adjustable moment counterweight assembly fixedly attached to the shaft and configured to rotate with the shaft. The counterweight assembly includes a counterweight having a mounting base configured for receiving the rotatable shaft with first and second arms positioned radially outward of the mounting base, and an adjustable counterweight. The adjustable counterweight is positioned between the first and second arms and is adjustably fastenable to the first and second arms at varying radial positions.

The present summary is provided only by way of example, and not limitation. Other aspects of the present disclosure will be appreciated in view of the entirety of the present disclosure, including the entire text, claims and accompanying figures.

Figure 1:
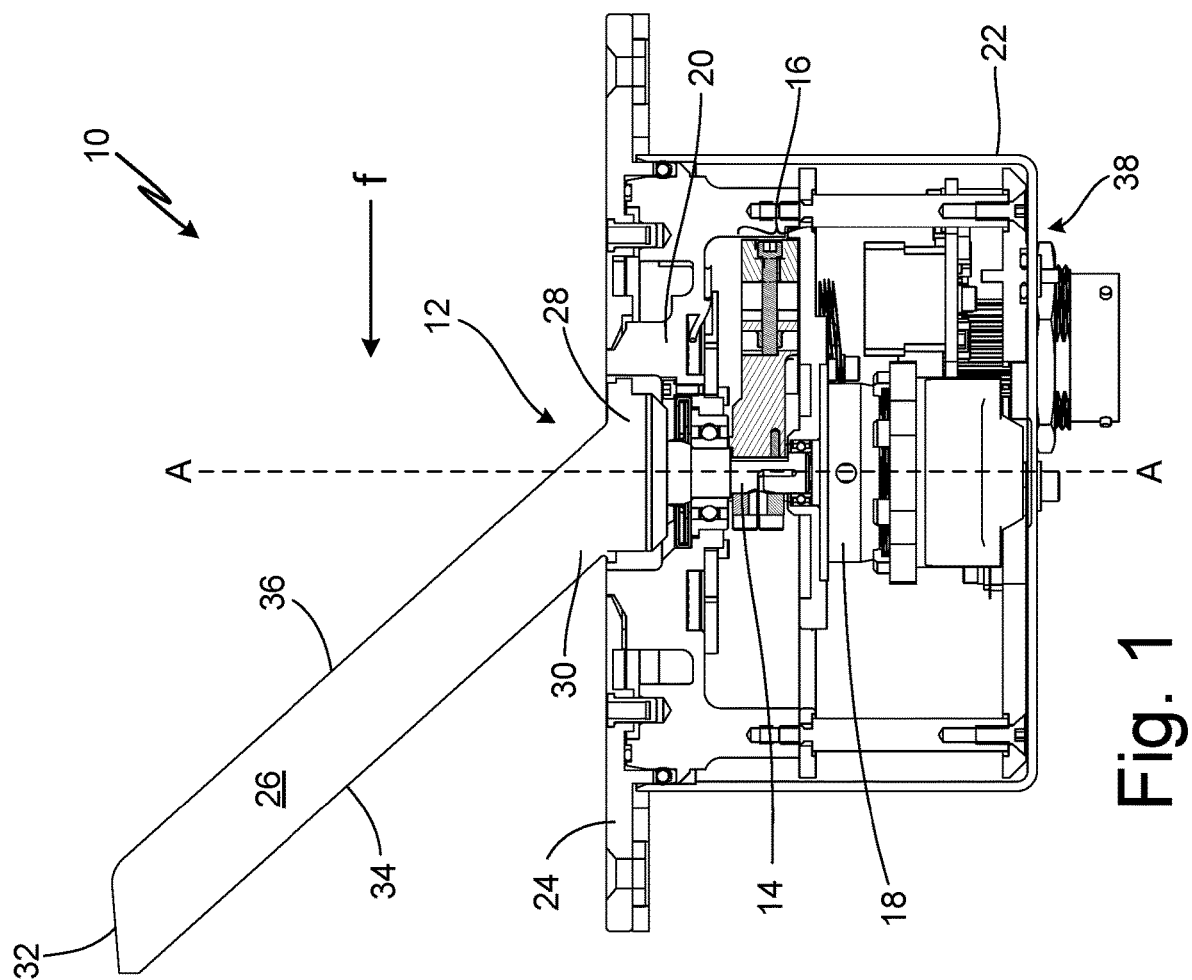
FIG. 1 is a cross-sectional side view of an angle of attack sensor.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed an adjustable moment counterweight assembly for an angle of attack sensor with rotatable vane. The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. The rotational position of the vane is sensed and used to determine the aircraft angle of attack (the angle between oncoming airflow and the aircraft zero line). The adjustable moment counterweight assembly is mounted on the same shaft as the vane to balance the vane and prevent the vane from rotating due to gravitational force, which could result in an erroneous sensor measurement. The adjustable moment counterweight assembly includes a mass that is moveable in a manner that allows an operator to finely adjust the counterweight assembly moment to provide system balance, and which is securely locked in position to prevent loss of system balance during operation. The adjustable moment counterweight assembly extends the moment adjustability range two to three times more than current adjustable counterweight assemblies, is less susceptible to unbalancing or failure due to vibration or impact, and can be manufactured entirely from corrosion resistant materials.

FIG. 1 is a cross-sectional side view of angle of attack sensor 10. Angle of attack sensor 10 includes vane assembly 12, rotatable shaft 14, adjustable moment counterweight 16, resolver 18, chassis 20, housing 22, and mounting plate 24. Vane assembly 12 includes vane 26 and vane base 28. Vane base 28 can be attached to or integrally formed with vane 26. Vane 26 includes root 30, tip 32, leading edge 36, and trailing edge 34. Vane assembly 12 and adjustable moment counterweight assembly 16 are securely mounted to rotatable shaft 14 and rotate with shaft 14 about an axis A-A. Vane assembly 12, shaft 14, and adjustable moment counterweight assembly 16 are mounted in chassis 20 and cylindrical housing 22. Vane base 28 is separated from chassis 20 to allow free rotation of vane 26. Vane 26 and chassis 20 can include heating elements to keep vane 26 and vane base 28 above freezing temperature and thereby free of ice during operation, which could limit rotation of vane 26. Cylindrical housing 22 is recessed in an aircraft outer skin. Mounting plate 24 is positioned on an external surface of the aircraft and secures angle of attack sensor 10 to aircraft via a plurality of fasteners 40. Vane base 28 can be mounted below mounting plate 24 or such that an outer surface of vane base 28 is substantially flush with and outer surface of mounting plate 24.

Vane 26 is positioned in an airflow f exterior to the aircraft with leading edge 36 forward of trailing edge 34. Adjustable moment counterweight assembly 16 is positioned on rotatable shaft 14 to align with vane leading edge 36. Adjustable moment counterweight assembly 16 is assembled to provide a moment of force that matches that of vane assembly 12 to balance vane assembly 12 and prevent rotation of vane 26 by gravitational force. The gravitational effect on vane assembly 12 is particularly relevant when the aircraft is traveling at lower air speeds (i.e., take-off). At higher air speeds, the proportional effect due to gravity is lessened by torque generated by vane 26. Oncoming airflow f causes vane assembly 12 to rotate with respect to mounting plate 24 and chassis 20 about axis A-A. Rotation of vane assembly 12 causes rotation of shaft 14. If adjustable moment counterweight assembly 16 properly balances vane assembly 12, vane 26 will align with oncoming airflow. Resolver 18 is mounted on rotatable shaft 14 and configured to sense rotation of shaft 14 and generate angle of attack readings. Resolver 18 can be any suitable rotational position sensor. Electrical system 38, which can include circuit boards, electrical connectors, and other electronic equipment, can power components of angle of attack sensor 10 and transmit angle of attack data to an aircraft control system. One or more end stops (not shown) can be provided to prevent full rotation of vane 26. Stops can be set to allow rotation of vane 26 within operational limits for angle of attack and can generally be set to limit rotation of vane assembly 12 to +/−100 degrees.

Figure 2:
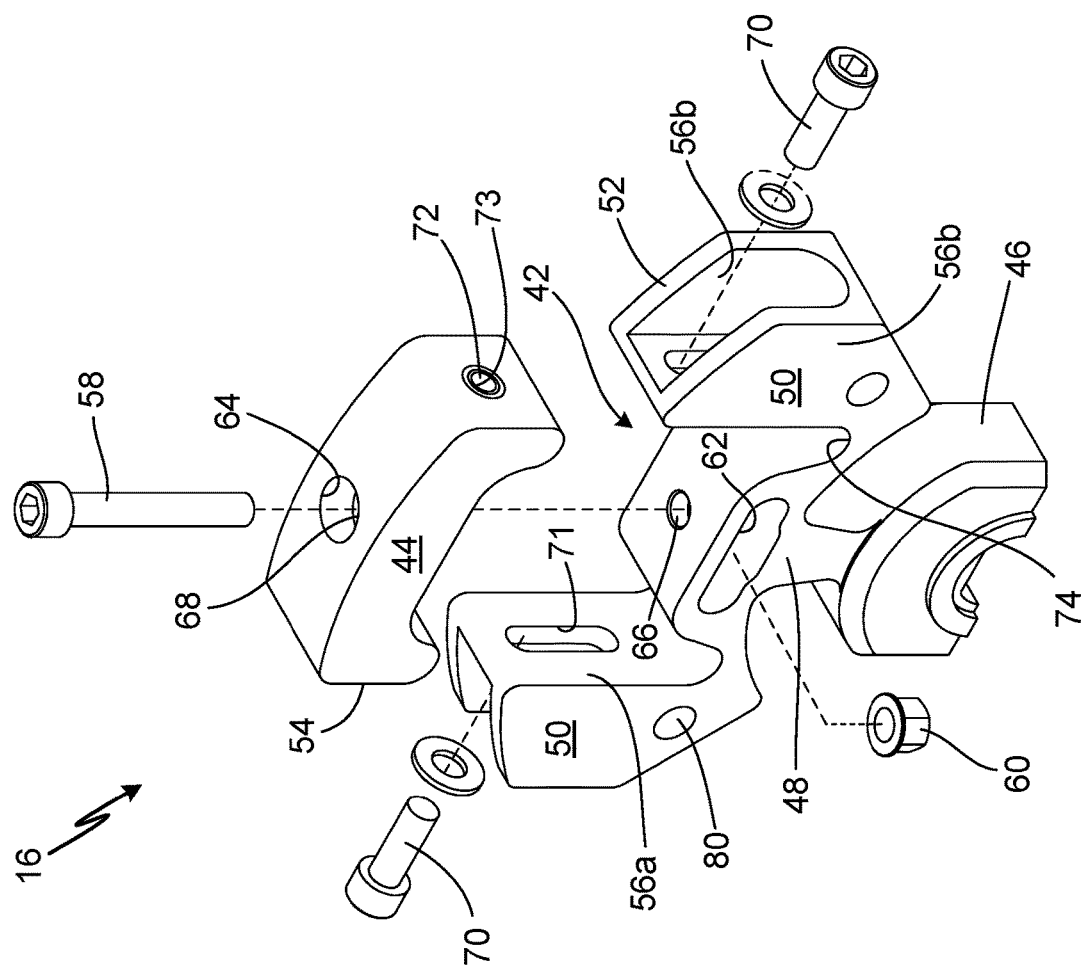
FIG. 2 is an exploded perspective view of an adjustable moment counterweight assembly for the angle of attack sensor of FIG. 1.
Figure 3B:
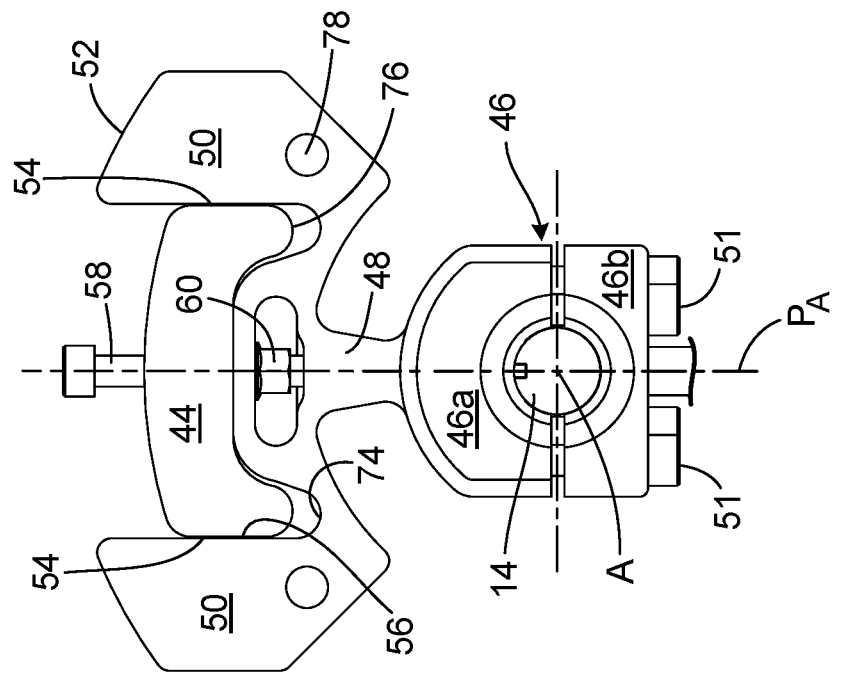
FIG. 3B is a top view of the adjustable moment counterweight assembly of FIG. 2 with the adjustable counterweight in a second position corresponding to a minimum moment of force.
Figure 3A:
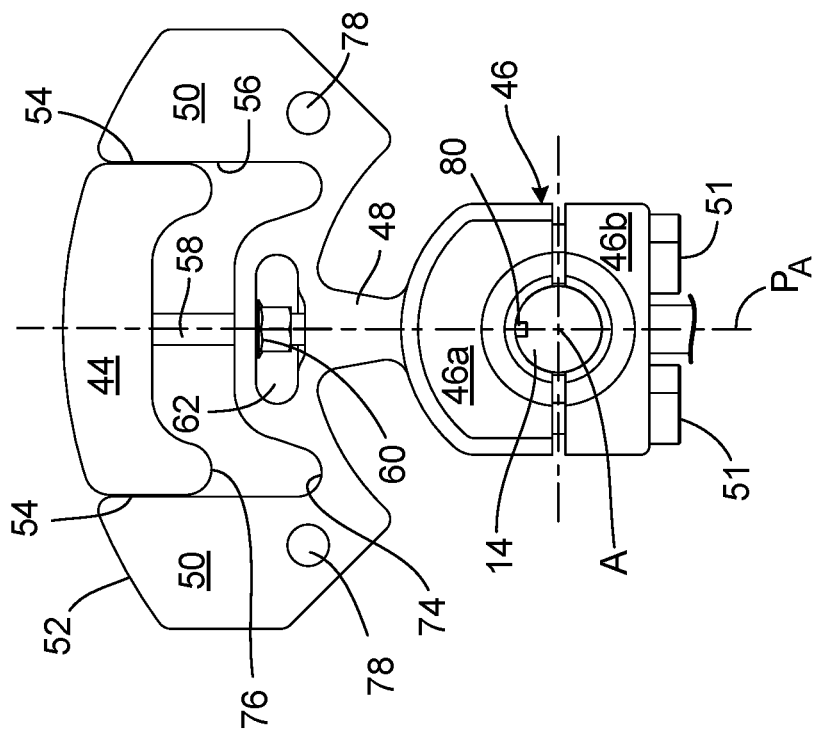
FIG. 3A is top view of the adjustable moment counterweight assembly of FIG. 2 with an adjustable counterweight in a first position corresponding to a maximum moment of force.

FIG. 2 is an exploded perspective view of adjustable moment counterweight assembly 16 for angle of attack sensor 10. Adjustable moment counterweight assembly 16 includes fixed counterweight 42 and adjustable counterweight 44. Fixed counterweight 42 includes mounting base 46, body portion 48, and arms 50. Fixed counterweight 42 contributes a fixed moment of force to counterweight assembly 16. Adjustable counterweight 44 can be attached to fixed counterweight 42 at varying radial locations to adjust the moment of counterweight assembly 16. FIG. 3A is top view of adjustable moment counterweight assembly 16 with adjustable counterweight 44 in a first position corresponding to a maximum moment of force. FIG. 3B is a top view of adjustable moment counterweight assembly 16 with adjustable counterweight 44 in a second position corresponding to a minimum moment of force. FIGS. 2, 3A, and 3B are discussed concurrently herein.

Mounting base 46 is configured to receive and be securely mounted to rotatable shaft 14. As illustrated in FIGS. 3A and 3B, mounting base 46 can have two parts 46a, 46b clamped together about an outer perimeter of shaft 14 with each part configured to receive half or 180 degrees of shaft 14. Inner surfaces of parts 46a and 46b and shaft 14 can have be shaped to limit relative rotation (e.g., shaft 14 can be hexagonal and inner surfaces of parts 46a and 46b can match the shape of shaft 14). Fasteners 51 can secure part 46b to 46a and prevent rotation of adjustable moment counterweight assembly 16 about shaft 14. Rotation of adjustable moment counterweight assembly is thereby to rotation with shaft 14 as driven by aerodynamic force applied to vane 26. The split retention mechanism of mounting base 46 provides ease of assembly, however, other means of retention can be used.

Body portion 48 extends radially outward from mounting base 46. As illustrated in FIGS. 2, 3A, and 3B, body portion 48 can reduce in width from mounting base 46 before widening to form arms 50. The reduced width can provide a space to accommodate components arranged around mounting base 46 when adjustable moment counterweight assembly 16 is rotated. In other embodiments, body portion 48 can extend outward from mounting base 46 to arms 50 as illustrated by dashed lines in FIG. 3B. The enlarged body portion can increase the moment of fixed counterweight 42. It will be understood by one of ordinary skill in the art that the size and shape of body portion 48 can be varied to accommodate the location of system components around mounting base 46 and to meet requirements for counterweight moment, and that the size and shape are not limited to those illustrated.

Arms 50 extend from either side of body portion 48 and are positioned radially outward of shaft 14, mounting base 46, and body portion 48. Arms 50 are separated and configured for receiving adjustable counterweight 44 therebetween. Arms 50 can have radially outer ends 52 that are contoured to match a contour of an inner surface of cylindrical housing 22 in assembly thereby maximizing use of available space within housing 22.

Adjustable counterweight 44 can have a generally rectangular or elongated shape with interfacing ends 54 configured to engage inner walls 56a of arms 50 upon assembly. Walls 56 and interfacing ends 54 can be substantially parallel to allow radial movement of adjustable counterweight 44 between arms 50 (i.e., toward or away from shaft 14). A small gap can be provided between walls 56a and interfacing ends 54 to allow adjustable counterweight 44 to move radially inward and outward between arms 50 without significant interference, while preventing rotation of adjustable counterweight 44 between arms 50. Adjustable counterweight 44 can be adjustably fastened to fixed counterweight 42 at varying radial positions corresponding to varying moments. The radial position of adjustable counterweight 44 can be set to provide adjustable moment counterweight assembly 16 with a moment equal to that of vane assembly 12. Adjustable counterweight 44 can be sized to provide a required moment and range of moment adjustability. An increased range of moment adjustability can allow for increased manufacturing tolerances and accommodation of assembly with vanes of varying weight or geometry.

Adjustable counterweight 44 can be secured to body portion 48 of fixed counterweight 42 with threaded member 58. As illustrated in FIGS. 2, 3A, and 3B, threaded member 58 extends radially through adjustable counterweight 44 into body portion 48 and parallel to interfacing ends 54 and arm inner walls 56a. Threaded member 58 can be secured to body portion with locking nut 60. Threaded member 58 and locking nut 60 can be received cavity 62 of body portion to allow assembly of locking nut 60 to an end or threaded member 58. Locking nut 60 retains threaded member 58 in fixed counterweight 42 while allowing for rotation of threaded member 58. Threaded member 58 is shown as a socket cap screw in FIG. 2, but can be any threaded fastener know in the art capable of translating adjustable counterweight 44 upon rotation. Threaded member 58 can extend through radially extending counterbore 64 in adjustable counterweight 44 and into through hole 66 in body portion 48 before entering cavity 62. Counterbore 64 allows the head of threaded member 58 to sit flush with a radially outer surface of adjustable counterweight 44 when adjustable counterweight 44 is positioned at a radially outermost extent as illustrated in FIG. 3A. Locking threaded insert 68 can be positioned underneath counterbore feature 64 in adjustable counterweight 44. Locking threaded insert 68 provides an additional means of retention for threaded member 58. Locking threaded insert 68 can be a helical, spiral, or other type of threaded inserts or locking threaded forms directly tapped into metal parts and capable of retaining threaded fastener when torque is applied (e.g., Spiralock® or Helicoil® inserts).

Adjustable counterweight 44 is moved radially between arms 50 by rotating threaded member 58 in a clockwise or counter clockwise direction (i.e., adjustable counterweight 44 moves radially outward with rotation in one direction and radially inward with rotation in the opposite direction). A large range of moment can be provided by increasing a range of radial locations or distance from shaft 14 that adjustable counterweight can be positioned. As illustrated in FIGS. 3A and 3B, adjustable counterweight assembly 16 has a maximum moment when adjustable counterweight 44 is positioned at a radially outermost extent and has a minimum moment when adjustable counterweight 44 is positioned at a radially innermost extent. At the radially outermost extent, adjustable counterweight 44 can be substantially aligned with radially outer ends 52. The radially outer surface of adjustable counterweight 44 can be similarly contoured to match a contour of the inner surface of cylindrical housing 22 to maximize use of available space within housing 22. At the innermost extent, a radially inner surface of adjustable counterweight 44 can abut a radially outer surface of body portion 48. Multiple rotations of threaded member 58 can be required to move adjustable counterweight 44 between the radially outermost extent and radially innermost extent, which provides the ability to make small adjustments to moment with a single turn or rotation and very fine adjustment with a partial turn. For example, in some embodiments, a quarter turn may adjust the moment of adjustable moment counterweight assembly 16 approximately 0.5 gram-centimeters.

Adjustable counterweight 44 can be locked in the optimal radial position by additional fasteners. As illustrated in FIG. 2, fasteners 70 can extend through arms 50 into interfacing ends 54 to secure adjustable counterweight 44 in the desired radial position. Arms 50 can have slots 71 or elongated holes extending perpendicular to fasteners 70 to allow the position of fasteners 70 to be adjusted to match a position of a receiving hole 72 in interfacing ends 54, which changes as adjustable counterweight 44 is moved radially between the outermost extent and innermost extent. Arms 50 can be substantially hollow with three walls 56a-56c extending toward radially outer end 52 and an opening extending from outer end 52 to a side opposite inner wall 56a. The illustrated structure of arms 50 can accommodate assembly with fasteners 70 while providing increased mass for fixed counterweight 42. The size and shape of walls 56b and 56c can be modified as necessary to meet a prescribed moment for fixed counterweight 42 and are not limited to the size and shape illustrated.

Fasteners 70 can be a hex cap screw or other threaded fastener. Locking threaded inserts 73 can be disposed in interfacing ends 54 to receive threaded fasteners 70 and provide an additional retention mechanism when torque is applied. Locking threaded inserts 73 can be helical, spiral, or other locking threaded inserts capable of retaining threaded fasteners 70. Other types of fasteners, including rivets, bolts, or other types of anchoring fasteners capable of securing adjustable counterweight 44 in a radial location during operation can be used. Two means for retention (e.g., torque and locking threaded insert) can be provided to prevent fasteners from backing out of interfacing ends 54 due to vibrational or impact loads during operation. Other retention mechanism, including but not limited to locking compound, are contemplated. However, retention mechanisms that allow for adjustment once adjustable moment counterweight assembly 16 is assembled in angle of attack sensor 10 are preferred. Threaded member 58 both retains and facilitates adjustment of the radial position of adjustable counterweight 44 (and consequently the moment of adjustable moment counterweight assembly 16), while fasteners 70 lock adjustable counterweight 44 in place radially relative to fixed counterweight 42 once positioned in a desired location.

In some embodiments, arms 50 can be separated from body portion 48 by concave portions 74. Concave portions 74 can allow arms to bend toward adjustable counterweight 44 when torque is applied to fasteners 70 thereby providing a tight fit with adjustable counterweight 44. The radially inner side of adjustable counterweight 44 can have convex portions 76 disposed adjacent to interfacing ends 54 and configured to be received in concave portions 74. Convex portions 76 can increase the mass of adjustable counterweight 44 without changing the distance adjustable counterweight 44 can be moved between the outermost extent and innermost extent.

Adjustable moment counterweight assembly 16 can be substantially symmetrical to provide an equal distribution of mass on either side of axial plane PA (shown in FIGS. 3A and 3B), which can be substantially aligned with leading edge 36 of vane 26 in assembly. The equal distribution of mass can make it easier to balance vane assembly 12. Minor differences or asymmetries may be present without significant impact on balancing.

All fasteners 58, 70, locking threaded inserts 68, 73, fixed counterweight 42, and adjustable counterweight 44 can be manufactured from the same material to eliminate the effects of material mismatch, such as corrosion, which could cause fasteners to loosen over the lifetime of the component and cause system imbalance. In some embodiments, adjustable moment counterweight assembly 16 can be fully manufactured from corrosion resistant stainless steel. Although stainless steel may be preferred for its resistance to corrosion, other materials are contemplated.

The size and shape of fixed counterweight 42 and adjustable counterweight 44 can be varied depending on requirements of angle of attack sensor 10, including balancing requirements and space within housing 22. Adjustable counterweight 44 can be designed and/or modified to accommodate a particular vane assembly 12. Fixed counterweight 42 can be manufactured to meet a prescribed moment of force. In some instances, minor adjustments can be made to adjust the moment after manufacture if necessary. For example, material can be removed from fixed counterweight 42 to adjust the moment. As illustrated in FIGS. 2, 3A, and 3B, a holes 78 of varying depth can be made on each side of body portion to adjust moment while maintaining symmetry.

The moment of vane assembly 12 and adjustable moment counterweight assembly 16 can be measured independently and prior to assembly in angle of attack sensor 10. As such, adjustable counterweight 44 can be positioned in fixed counterweight 42 to meet a required moment for balancing vane assembly 12 prior to assembling adjustable moment counterweight assembly 16 in angle of attack sensor 10. Once assembled in angle of attack sensor 10, further adjustments can be made if necessary. Access to each member 58 and fasteners 70 can be provided through an opening in housing 22 (not shown). Shaft 14 can be rotated to position threaded member 58 and each fastener 70 at the opening for adjustment.

In assembly, adjustable counterweight 44 is fastened to body portion 48 of fixed counterweight 42 with threaded member 58 and locking nut 60. Threaded member 58 is rotated clockwise and/or counter clockwise to move adjustable counterweight 44 toward and/or away from body portion 48. Adjustable counterweight 44 is moved to change the moment of adjustable moment counterweight assembly 16 until a prescribed moment matching that of vane assembly 12 is reached. A moment measurement machine can be used to measure the moment of adjustable moment counterweight assembly 16 with adjustable counterweight 44 in different radial positions. Once the prescribed moment is obtained, adjustable counterweight 44 is locked in position by fasteners 70. Fasteners 70 are inserted through arms 50 of fixed counterweight 42 and into interfacing ends 54 of adjustable counterweight 44. Interfacing ends 54 can include locking threaded inserts to provide a second means of retention in addition to torque. Fasteners 70 are oriented tangential to threaded member 58, which extends radially through adjustable counterweight 44. Once adjustable counterweight 44 is secured in the location corresponding to a prescribed moment, adjustable moment counterweight assembly 16 can be mounted to shaft 14 in angle of attack sensor 10. In some embodiments, locating pin 80 can be used to position adjustable moment counterweight assembly 16 relative to vane 22 on shaft 14.

The adjustable moment counterweight assembly includes a mass that is moveable in a manner that allows an operator to finely adjust the counterweight assembly moment to provide system balance and which is securely locked in position to prevent loss of system balance during operation. The adjustable moment counterweight assembly of the present disclosure extends the moment adjustability range two to three times more than current adjustable counterweight assemblies, is less susceptible to vibrational and impact loadings, and can be manufactured entirely from corrosion resistant materials.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

An adjustable moment counterweight assembly for an angle of attack sensor includes a fixed counterweight configured to fixedly attach to a shaft of the angle of attack sensor, the shaft being rotatable about an axis; an adjustable counterweight configured to move in a radial direction relative to the fixed counterweight via rotation of a threaded member; and a first fastener in operable communication with the fixed counterweight and the adjustable counterweight such that the first fastener can fixedly attach the adjustable counterweight to the fixed counterweight.

The adjustable moment counterweight assembly of the preceding paragraph can optionally include, additionally and/or alternatively, any one or more of the following features, configurations and/or additional components:

A further embodiment of the foregoing adjustable moment counterweight assembly can further include a second fastener in operable communication with the fixed counterweight and the adjustable counterweight such that the second fastener can fixedly attach the adjustable counterweight to the fixed counterweight.

A further embodiment of any of the foregoing adjustable moment counterweight assemblies, wherein the adjustable counterweight can be positioned between first and second arms of the fixed counterweight and wherein the first fastener extends through a first hole in the first arm and into a first end of the adjustable counterweight and the second fastener extends through a second hole in the second arm and into a second end of the adjustable counterweight, and wherein the first and second holes are slots extending perpendicular to the first and second fasteners.

A further embodiment of any of the foregoing adjustable moment counterweight assemblies, wherein the threaded member extends radially through the adjustable counterweight into a body portion of the fixed counterweight, the body portion disposed between the first and second arms.

A further embodiment of any of the foregoing adjustable moment counterweight assemblies, wherein the first and second arms can include first and second walls, respectively, wherein the first and second walls can extend parallel to the threaded member.

A further embodiment of any of the foregoing adjustable moment counterweight assemblies, wherein an end of the threaded member can be received in a cavity of the body and retained in the cavity with a locking nut.

A further embodiment of any of the foregoing adjustable moment counterweight assemblies wherein rotating the threaded member can cause the adjustable counterweight to move radially inward and outward.

A further embodiment of any of the foregoing adjustable moment counterweight assemblies, wherein the first and second fasteners can be threaded and wherein the adjustable counterweight can include first and second locking threaded inserts, in which first and second threaded fasteners are received, respectively, to retain first and second threaded fasteners in a locked position.

A further embodiment of any of the foregoing adjustable moment counterweight assemblies, wherein the counterweight can be symmetrical about an axial plane separating the first arm from the second arm.

A further embodiment of any of the foregoing adjustable moment counterweight assemblies, wherein the first and second arms can be separated from the body portion by first and second concave portions.

A further embodiment of any of the foregoing adjustable moment counterweight assemblies, wherein a radially inner side of the adjustable counterweight can have first and second convex portions disposed adjacent first and second ends, respectively, and wherein the first and second convex portions can be configured to be received in the first and second concave portions.

A method of adjusting a counterweight assembly for an angle of attack sensor includes fastening an adjustable counterweight to a body portion of a fixed counterweight with a threaded member, rotating the threaded member to move the adjustable counterweight toward and/or away from the body portion of the fixed counterweight to obtain a prescribed first moment for the counterweight assembly, locking the adjustable counterweight in a position providing the first moment, and mounting the counterweight assembly to a rotatable shaft to which a vane is secured. The threaded member is fastened to the body portion with a locking nut disposed in the body portion of the fixed counterweight.

The method of the preceding paragraph can optionally include, additionally and/or alternatively, any one or more of the following features, configurations, additional components, and/or steps:

A further embodiment of the foregoing method, wherein locking the adjustable counterweight can include inserting a second fastener through the fixed counterweight into a first end of the adjustable counterweight and providing torque to lock the second fastener in position, and inserting a third fastener through the fixed counterweight into a second end of the adjustable counterweight, the second end located opposite the first end, and providing torque to lock the third fastener in position.

A further embodiment of any of the foregoing methods, wherein the first and second fasteners can be received in locking threaded inserts disposed in the adjustable counterweight.

A further embodiment of any of the foregoing methods can further include removing material from the fixed counterweight to obtain a prescribed second moment of the fixed counterweight.

An angle of attack sensor includes a rotatable shaft disposed on an axis, a vane fixedly attached to the rotatable shaft and configured to rotate the shaft when a force acts upon the vane, and an adjustable moment counterweight assembly fixedly attached to the shaft and configured to rotate with the shaft. The counterweight assembly includes a counterweight having a mounting base configured for receiving the rotatable shaft with first and second arms positioned radially outward of the mounting base, and an adjustable counterweight. The adjustable counterweight is positioned between the first and second arms and is adjustably fastenable to the first and second arms at varying radial positions.

The angle of attack sensor of the preceding paragraph can optionally include, additionally and/or alternatively, any one or more of the following features, configurations and/or additional components:

A further embodiment of the foregoing angle of attack sensor, wherein the adjustable moment counterweight assembly can further include first and second threaded fasteners for locking the adjustable counterweight in a radial position, wherein the first threaded fastener extends through a first slotted hole in the first arm and into a first end of the adjustable counterweight and wherein the second threaded fastener extends through a second slotted hole in the second arm and into a second end of the adjustable counterweight.

A further embodiment of any of the foregoing angle of attack sensors, wherein the adjustable moment counterweight assembly can further include a threaded member extending through the adjustable counterweight into a body portion of the fixed counterweight, the body portion disposed between the first and second arms.

A further embodiment of any of the foregoing angle of attack sensors, wherein an end of the threaded member can be retained in the body portion by a locking nut and wherein rotation of the threaded member causes the adjustable counterweight to move radially inward and outward.

A further embodiment of any of the foregoing angle of attack sensors, wherein the adjustable counterweight can include first and second locking threaded inserts, in which first and second threaded fasteners are received, respectively, to retain first and second threaded fasteners in a locked position.

A further embodiment of any of the foregoing angle of attack sensors, wherein the first and second arms can be separated from the body portion by first and second concave portions, and wherein a radially inner side of the adjustable counterweight has first and second convex portions disposed adjacent first and second ends, respectively, the first and second convex portions being configured to be received in the first and second concave portions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An adjustable moment counterweight assembly for an angle of attack sensor, the adjustable moment counterweight assembly comprising:
 a fixed counterweight configured to fixedly attach to a shaft of the angle of attack sensor, the shaft being rotatable about an axis;
 an adjustable counterweight configured to move in a radial direction relative to the fixed counterweight via rotation of a threaded member; and
 a first fastener in operable communication with the fixed counterweight and the adjustable counterweight such that the first fastener can fixedly attach the adjustable counterweight to the fixed counterweight.

2. The adjustable moment counterweight assembly of claim 1, and further comprising a second fastener in operable communication with the fixed counterweight and the adjustable counterweight such that the second fastener can fixedly attach the adjustable counterweight to the fixed counterweight.

3. The adjustable moment counterweight assembly of claim 2, wherein the adjustable counterweight is positioned between first and second arms of the fixed counterweight and wherein the first fastener extends through a first hole in the first arm and into a first end of the adjustable counterweight and the second fastener extends through a second hole in the second arm and into a second end of the adjustable counterweight, and wherein the first and second holes are slots extending perpendicular to the first and second fasteners.

4. The adjustable moment counterweight assembly of claim 3, wherein the threaded member extends radially through the adjustable counterweight into a body portion of the fixed counterweight, the body portion disposed between the first and second arms.

5. The adjustable moment counterweight assembly of claim 4, wherein the first and second arms comprise first and second walls, respectively, wherein the first and second walls extend parallel to the threaded member.

6. The adjustable moment counterweight assembly of claim 4, wherein an end of the threaded member is received in a cavity of the body and retained in the cavity with a locking nut.

7. The adjustable moment counterweight assembly of claim 4, wherein the first and second fasteners are threaded and wherein the adjustable counterweight comprises first and second locking threaded inserts, in which first and second threaded fasteners are received, respectively, to retain first and second fasteners in a locked position.

8. The adjustable moment counterweight assembly of claim 6, wherein the counterweight is symmetrical about an axial plane separating the first arm from the second arm.

9. The adjustable moment counterweight assembly of claim 8, wherein the first and second arms are separated from the body portion by first and second concave portions.

10. The adjustable moment counterweight assembly of claim 9, wherein a radially inner side of the adjustable counterweight has first and second convex portions disposed adjacent first and second ends, respectively, and wherein the first and second convex portions are configured to be received in the first and second concave portions.

11. A method of adjusting a counterweight assembly for an angle of attack sensor, the method comprising:
 fastening an adjustable counterweight to a body portion of a fixed counterweight with a threaded member and a locking nut disposed in the body portion of the fixed counterweight;
 rotating the threaded member to move the adjustable counterweight toward and/or away from the body portion of the fixed counterweight to obtain a prescribed first moment for the counterweight assembly;
 locking the adjustable counterweight in a position providing the first moment;
 mounting the counterweight assembly to a rotatable shaft to which a vane is secured.

12. The method of claim 11, wherein locking the adjustable counterweight comprises:
 inserting a first fastener through the fixed counterweight into a first end of the adjustable counterweight and providing torque to lock the first fastener in position, and
 inserting a second fastener through the fixed counterweight into a second end of the adjustable counterweight, the second end located opposite the first end, and providing torque to lock the second fastener in position.

13. The method of claim 12, wherein the first and second fasteners are received in locking threaded inserts disposed in the adjustable counterweight.

14. The method of claim 12, and further comprising removing material from the fixed counterweight to obtain a prescribed second moment of the fixed counterweight.

15. An angle of attack sensor comprising:
 a rotatable shaft disposed on an axis;
 a vane fixedly attached to the rotatable shaft and configured to rotate the shaft when a force acts upon the vane;
 an adjustable moment counterweight assembly fixedly attached to the shaft and configured to rotate with the shaft, wherein the counterweight assembly comprises:
  a fixed counterweight comprising:
   a mounting base configured for receiving the rotatable shaft; and
   first and second arms positioned radially outward of the mounting base; and
  an adjustable counterweight positioned between the first and second arms and adjustably fastenable to the first and second arms at varying radial positions.

16. The angle of attack sensor of claim 15, wherein the adjustable moment counterweight assembly further comprises first and second threaded fasteners for locking the adjustable counterweight in a radial position, wherein the first threaded fastener extends through a first slotted hole in the first arm and into a first end of the adjustable counterweight and wherein the second threaded fastener extends through a second slotted hole in the second arm and into a second end of the adjustable counterweight.

17. The angle of attack sensor of claim 16, wherein the adjustable moment counterweight assembly further comprises a threaded member extending through the adjustable counterweight into a body portion of the fixed counterweight, the body portion disposed between the first and second arms.

18. The angle of attack sensor of claim 17, wherein an end of the threaded member is retained in the body portion by a locking nut and wherein rotation of the threaded member causes the adjustable counterweight to move radially inward and outward.

19. The angle of attack sensor of claim 17, wherein the adjustable counterweight comprises first and second locking threaded inserts in which first and second threaded fasteners are received, respectively, to retain first and second threaded fasteners in a locked position.

20. The angle of attack sensor of claim 17, wherein the first and second arms are separated from the body portion by first and second concave portions, and wherein a radially inner side of the adjustable counterweight has first and second convex portions disposed adjacent first and second ends, respectively, the first and second convex portions being configured to be received in the first and second concave portions.

* * * * *